(12) United States Patent
Gandhi et al.

(10) Patent No.: US 12,063,941 B2
(45) Date of Patent: Aug. 20, 2024

(54) RESTRUCTURED NATURAL PROTEIN MATRICES

(71) Applicant: Jeneil Biotech, Inc., Saukville, WI (US)

(72) Inventors: Niranjan R. Gandhi, River Hills, WI (US); Victoria Palmer Skebba, Cedarburg, WI (US); Franco X. Milani, De Forest, WI (US)

(73) Assignee: Jeneil Biosurfactant Company, LLC, Saukville, WI (US)

( * ) Notice: Subject to any disclaimer, the term of this patent is extended or adjusted under 35 U.S.C. 154(b) by 425 days.

(21) Appl. No.: 14/217,284

(22) Filed: Mar. 17, 2014

(65) Prior Publication Data

US 2014/0322423 A1    Oct. 30, 2014

Related U.S. Application Data

(60) Provisional application No. 61/852,465, filed on Mar. 15, 2013.

(51) Int. Cl.
| | |
|---|---|
| *A23C 19/09* | (2006.01) |
| *A23C 19/068* | (2006.01) |
| *A23C 19/072* | (2006.01) |
| *A23C 19/082* | (2006.01) |
| *A23C 19/093* | (2006.01) |

(52) U.S. Cl.
CPC ........ *A23C 19/0925* (2013.01); *A23C 19/068* (2013.01); *A23C 19/0684* (2013.01); *A23C 19/072* (2013.01); *A23C 19/082* (2013.01); *A23C 19/09* (2013.01); *A23C 19/0921* (2013.01); *A23C 19/093* (2013.01)

(58) Field of Classification Search
CPC .................................................. A23C 19/0925
USPC ........................................................ 426/36
See application file for complete search history.

(56) References Cited

U.S. PATENT DOCUMENTS

| | | | | |
|---|---|---|---|---|
| 4,066,800 A | * | 1/1978 | Rosenau ............ | A23C 19/0455 426/582 |
| 4,197,322 A | | 4/1980 | Middleton | |
| 4,217,370 A | * | 8/1980 | Rawlings ............. | A23C 19/086 426/573 |
| 4,292,333 A | | 9/1981 | Bosco et al. | |
| 4,343,817 A | | 8/1982 | Swanson et al. | |
| 4,397,926 A | * | 8/1983 | Galal ..................... | A23C 20/00 426/582 |
| 4,444,800 A | | 4/1984 | Bixby et al. | |
| 4,459,313 A | * | 7/1984 | Swanson ............. | A23C 19/0686 426/104 |
| 5,064,660 A | * | 11/1991 | Silver .................... | A23C 15/16 426/36 |
| 5,505,979 A | * | 4/1996 | Sevenich ............. | A23C 19/082 426/582 |
| 5,567,464 A | | 10/1996 | Barz et al. | |
| 5,750,177 A | | 5/1998 | Yee et al. | |
| 5,902,625 A | | 5/1999 | Barz et al. | |
| 6,586,025 B2 | | 7/2003 | Yvon et al. | |
| 7,309,510 B2 | | 12/2007 | Sekula et al. | |
| 2004/0018292 A1 | | 1/2004 | Lindstrom et al. | |
| 2004/0170747 A1 | | 9/2004 | Sekula et al. | |
| 2005/0249854 A1 | | 11/2005 | Merrill et al. | |
| 2007/0065560 A1 | * | 3/2007 | Lee .......................... | A23J 3/08 426/582 |
| 2007/0082086 A1 | * | 4/2007 | Carr ....................... | A23C 19/08 426/34 |
| 2010/0196575 A1 | | 8/2010 | Sanchez et al. | |

FOREIGN PATENT DOCUMENTS

| | | |
|---|---|---|
| CN | 102164496 A | 8/2011 |
| GB | 551704 A | 5/1943 |
| GB | 2004727 B | 1/1982 |
| JP | S5459363 A | 5/1979 |
| JP | 56148240 A | 11/1981 |
| NZ | 202051 A | 10/1984 |
| WO | 7900111 A1 | 3/1979 |
| WO | 03039265 A1 | 5/2003 |
| WO | 2005013710 A1 | 2/2005 |
| WO | 2009108074 A1 | 9/2009 |

OTHER PUBLICATIONS

Kapoor, R. et al. "Process Cheese: Scientific and Technological Aspects—A Review", Comprehensive Reviews in Food Science and Food Safety, vol. 7, 2008, 194-214.
Lucey, J.A. et al. "Importance of Calcium and Phosphate in Cheese Manufacture: A Review", J Diary Sci 1993, vol. 76 (6), 1714-1724.
Soledad, M., "Development of a Reformed Swiss Cheese Product without Emulsifying Salts", The Ohio State 1 University, 2010, 138 pages.
Ramirez-Lopez, C. et al., "Quesos frescos: propiedades, metodos de determinacion y factores que afectan su calidad", Temas Selectos de Ingenieria de Alimentos 6-2, 2012, 131-148.
Extended European Search Report for 14763983.5 dated Oct. 21, 2016, 8 pages.
International Search Report from PCT/US2014/030879 issued on Aug. 14, 2014, 3 pages.
Bradley, et al., "Determination of Moisture in Cheese and Cheese Products" Journal of AOAC International, 2001, vol. 84, No. 2 pp. 570-592.
Cheese, California Milk and Advisory Board, https://www.californiadairypressroom.com/Products/Cheese, Dec. 30, 2008.
Ustunol, Z., "Processed Cheese: What is that Stuff Anyway?", Michigan Dairy Review, vol. 14., No. 2, Apr. 2009.

\* cited by examiner

*Primary Examiner* — Hamid R Badr
(74) *Attorney, Agent, or Firm* — Reinhart Boerner Van Deuren s.c.

(57) ABSTRACT

Methods as can be used in the preparation of one or more dairy, dairy analog and cheese products from a range of proteinaceous starting materials, such methods comprising protein modification and protein restoration or protein restructure.

12 Claims, 2 Drawing Sheets

RESTRUCTURED NATURAL PROTEIN MATRICES

This application claims priority benefit of application Ser. No. 61/852,465 filed Mar. 15, 2013, the entirety of which is incorporated herein by reference.

BACKGROUND OF THE INVENTION

Structural transformations are an important part of the modern food industry. Raw materials are changed into refined food products by processing agricultural output. A major objective of food structuring is to recombine food components for improved utilization of food resources. Alternatively, from an economic prospective, such restructuring can be designed to yield products deemed more valuable in the market place.

More specifically, restructuring is directed to four basic food components: water, proteins, fats and carbohydrates. Micronutrients (e.g., vitamins and minerals) and other microcomponents such as flavors, colors, preservatives and other functional additives (e.g., stabilizers, emulsifiers, etc.) are often introduced at some point during the restructuring process. Regardless, of the four basic components, restructuring processes are most often directed to proteins and starches. Reasons underlying protein and starch restructure include a worldwide demand for dietary protein and carbohydrates and higher prices associated with these foods, thereby supporting higher profit margins and corresponding economic activity.

The preparation and subsequent use of soy milk, basically a suspension of ground soybeans and water, is well-known and illustrates several widely used techniques for protein restructuring. While soy milk can be consumed as a beverage or fermented, it is more often used as a starting material for several other structured food products. For instance, tofu is prepared by precipitating soy milk proteins with a calcium salt to form a coagulum that is then drained, pressed and washed to yield a proteinaceous food product.

Various other restructuring techniques can be considered in the context of comminuted meat products, whereby an oil-in-water emulsion is entrapped in a gel of insoluble proteins and muscle fibers. A raw meat protein matrix system, typically low-value, high-connective tissue meat cuts or trimmings, is ground to reduce particle size. After initial grinding, the meat protein matrix is blended with various emulsifying salts (e.g., phosphates, etc.) and other ingredients to promote extraction of a myofibrillar binder. Such muscle proteins bind better under elevated temperature conditions. In these processes, cooking serves to reactivate the protein binder, recombine the ground particles and complete the restructuring process. Such meat-emulsions are quite stable, but even if coalescence does occur, movement of the fat globules is confined by the restructured protein matrix.

Cheese illustrates other aspects relating to protein restructuring. From a historical perspective, process cheese was initially developed to address homogeneity and shelf-life issues inherent to natural cheese. While natural cheese is made directly from milk, process cheese is produced by blending one or more natural cheeses in the presence of emulsifying agents and, optionally, other dairy and non-dairy ingredients. Heat processing with continuous mixing leads to a more homogeneous product with extended shelf life. Under the United States Code of Federal Regulations (CFR), process cheese is a generic term including pasteurized process cheeses, pasteurized process cheese foods and pasteurized process cheese spreads, all of which are regulated on the basis of process parameters, ingredients, fat and moisture content and the like. (See, 21 CFR 133.169-133.180.) Together with choice of natural cheese (e.g., with respect to age, flavor, etc.), selection of an appropriate emulsifying agent is a key consideration in determining the physiochemical and functional properties of a resulting process cheese.

Currently, thirteen emulsifying agents (either alone or in combination) are approved for use: mono-, di-, and trisodium phosphates, dipotassium phosphate, sodium hexametaphosphate, sodium acid pyrophosphate, tetrasodium pyrophosphate, sodium aluminum phosphate, sodium citrate, potassium citrate, calcium citrate, sodium tartrate, and sodium potassium tartrate. The most common emulsifying salts used for process cheese manufacture in the United States are trisodium citrate and disodium phosphate. Trisodium citrate is the preferred emulsifying salt for slice-on-slice process cheese varieties, whereas disodium phosphate (or appropriate combinations of di- and trisodium phosphates) is used in loaf-type process cheese and process cheese spreads. In certain applications, low levels of sodium hexametaphosphate are also used along with these emulsifying salts. Sodium aluminum phosphate is frequently used in conjunction with mozzarella type imitation process cheese varieties to replace mozzarella on frozen pizzas. Regardless, the weight of the solids of such an emulsifying salt or salts is not more than 3 percent of the weight of a corresponding CFR-defined process cheese. (21 CFR § 133.169(c).) Emulsifiers used in process cheese not defined by the CFR follow the tenants of being safe and suitable.

Generally, emulsifying salts serve to sequester calcium and adjust pH. Both functions assist hydration of proteins present in natural cheese, to facilitate interaction with the aqueous and fat phases, thereby producing a more homogeneous emulsion. More specifically, the function of such salts can be understood by contrasting it to natural cheese production. Bovine milk is characterized by four major types of casein proteins: $\alpha_{s1}$-casein, $\alpha_{s2}$-casein, $\beta$-casein and $\kappa$-casein—each of which is amphiphilic, with hydrophobic and hydrophilic components, and containing covalently-attached phosphate groups. In an aqueous emulsion environment, milk caseins adopt a micellular configuration stabilized by protein-protein hydrophobic interactions and colloidal calcium phosphate-mediated cross-linking $\kappa$-casein is primarily present on the micelle surface, with the hydrophobic component embedded therein and a negatively-charged hydrophilic component directed outward into the aqueous phase. Micelles repel each other, thereby stabilizing the emulsion. During natural cheese production, enzymatic (e.g., rennet) action on $\kappa$-casein cleaves the hydrophilic component destabilizing the micelles. Calcium-mediated cross-linking between phosphoserine residues of the $\alpha$- and $\beta$-caseins produces a network of water-insoluble calcium-paracaseinate phosphate complexes, commonly referred to as curds, with the fat phase suspended therein.

In contrast to natural cheese, process cheese can be described as a stable oil-in-water emulsion. Emulsifying agents, such as the salts described above, improve casein emulsification by—in conjunction with continued heating and mixing—displacing the calcium phosphate complexes and dispersing the calcium-paracaseinate phosphate network. The dispersed network interacts with the fat phase and, upon cooling, provides a process cheese structure—new and distinct from a natural cheese structure with a fat phase emulsified by a uniform protein gel.

The resulting stable, homogeneous process cheese structure affords a wide range of product forms (e.g., loaves, slices, grates, shreds, spreads and the like) and a corresponding range of end-use applications in the food preparation and service industry. However, the prior art recognizes a number of drawbacks and deficiencies, several of which can be directly related to the use of emulsifying salts. For instance, unsightly crystal formation is observed and has been linked to the relative insolubility of various phosphate and citrate salts, as further influenced by pH or storage conditions. From a more functional perspective, oil separation can result from improper salt content in conjunction with pH, casein level and process temperature considerations. Further, unmelted and melted textural properties of process cheese can be adversely affected by choice of emulsifying salt. Perhaps most consequential, adverse consumer perceptions are drawn from inclusion of emulsifying salts (e.g., pyrophosphates, aluminum phosphates, etc.) on product labels.

Accordingly, together with other long-standing issues related to process cheese, there remains an on-going concern in the art to provide a cheese product affording selected benefits of process cheese without disadvantages associated with use of emulsifying salts.

SUMMARY OF THE INVENTION

In light of the foregoing, it is an object of the present invention to provide one or more methods for the preparation of restructured protein matrices, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide a value-added natural cheese from lower cost natural cheese starting materials.

It can be another object of the present invention to provide such a value-added natural cheese, with uniform pre-determined flavor, texture and structural characteristics, notwithstanding corresponding inconsistencies with regard to natural cheese starting materials.

It can be another object of the present invention, alone or in conjunction with one or more of the preceding objectives, to achieve such results without emulsifying salts of the sort used for process cheese.

Other objects, features, benefits and advantages of the present invention will be apparent from this summary and the following descriptions of various embodiments, and will be readily apparent to those skilled in the art having knowledge of various cheese production techniques. Such objects, features, benefits and advantages will be apparent from the above as taken into conjunction with the accompanying examples, data, figures and all reasonable inferences to be drawn therefrom.

Generally, the present invention can be directed to a method of preparing a restructured proteinaceous food product. Such a method can comprise providing an initial matrix system comprising water, fat, protein and salts; treating such a matrix system with a modification component comprising a reagent selected from hydroxide species, anionic basic species and combinations thereof, such a reagent as can be in an amount at least partially sufficient to modify a secondary, tertiary or quaternary structure of such a matrix protein, such modification as can be considered with respect to a visco-elastic property of such a matrix system; and interacting such a modified matrix system with a flavoring composition comprising at least one flavor component uniquely formulated for a particular proteinaceous food product, such a flavoring composition as can be in an amount at least partially sufficient to restructure such a modified matrix system. In certain embodiments, each of the aforementioned treatment or matrix modification and interaction or matrix restructure steps can be conducted at ambient/room temperatures and pressures, lower such temperatures, elevated such temperatures, positive pressures, negative pressures and/or combinations of such conditions. In certain such embodiments, elevated temperatures can be accomplished by heating such a matrix system through conduction, convection, microwave and infrared processes, and combinations thereof, or as would otherwise be understood by those skilled in the art made aware of this invention.

Regardless, a fat component of such a matrix system can be selected from animal fats, vegetable fats, fats derived from microbiological sources and combinations thereof and, independently, a protein of such a matrix system can be selected from animal proteins, vegetable proteins, proteins derived from microbiological sources and combinations thereof. Without regard to fat or protein identity, a matrix modification component can be selected from food grade alkaline metal hydroxide salts, food grade Lewis base reagents and combinations thereof. Likewise, without regard to fat and protein identity or matrix modification component utilized, such a flavoring composition can comprise components selected from organic alcohols, aldehydes, ketones, acids, acid salts, acid esters, mineral acids and acid salts, and combinations thereof. As mentioned above and illustrated elsewhere herein, such a composition, upon interaction with a modified matrix system, can be formulated to provide a restructured proteinaceous food product with one or more flavor characteristics.

Without limitation as to flavoring composition, matrix system fat/protein or modification component, one or more optional additives can be introduced at a time of matrix treatment/modification or interaction/matrix restructure or both, such additives as can be chosen to affect flavor, texture, moisture content and one or more other characteristics of a restructured proteinaceous food product. Likewise, without limitation, such additives can be selected from proteins, fats, oils, carbohydrates, preservatives, minerals, nutrients and combinations thereof, in an amount at least partially sufficient to affect one or more food product characteristics. In certain such embodiments, one or more dried or partially dried proteins, carbohydrates and combinations thereof can be utilized to affect moisture content. In various other embodiments, alone or together with other such additives(s), one or more flavors, spices, colorants, extracts, fruits, meats and combinations thereof can be utilized to affect flavor. Further, certain embodiments can incorporate various enzymes, cultures and/or related probiotic additives and combinations thereof. Any such additive can be synthetic or derived from various plant, animal and microbiological sources and combinations thereof.

Regardless, a modified matrix system can be restructured to provide a proteinaceous food product with a texture comprising one or more characteristics of an initial matrix system or modified characteristics unique to a particular end-result proteinaceous food product.

In part, the present invention can also be directed toward a method of preparing a restructured dairy or dairy analog based food product. Such a method can comprise providing an initial matrix system comprising water, fat, protein selected from dairy proteins and dairy analog proteins and combinations thereof, and salts; treating such a matrix system with a modification component comprising a reagent selected from excess hydroxide species, anionic basic species and combinations thereof, such a reagent as can be in an amount at least partially sufficient to modify a secondary, tertiary or quaternary structure of such a matrix protein, such modification as can be considered with respect to a visco-elastic property of such a matrix system; and interacting such a modified matrix system with a flavoring composition comprising at least one flavor component uniquely formulated for a particular proteinaceous food product, such a flavoring composition as can be in an amount at least partially sufficient to restructure such a modified matrix system. As discussed above, in certain embodiments, each of the aforementioned treatment/matrix modification or interaction/matrix restructure steps, or both can be conducted at ambient temperatures and pressures, lower such temperatures, elevated such temperatures, positive pressures, negative pressures or combinations of such conditions.

Without limitation, fat and matrix modification components can be as discussed above or illustrated elsewhere herein. Regardless, such a flavoring composition can comprise component ingredients selected from organic alcohols, aldehydes, ketones, acids, acid salts, acid esters, mineral acids and acid salts and combinations thereof. In certain embodiments, such component ingredients can include one or more organic acids, one or more mineral acids or combinations thereof (e.g., one or more protic acids). In certain such embodiments, matrix pH, structure and/or functionality can be adjusted depending on desired food product. More generally, such a composition can be formulated to provide such a restructured product, a dairy or cheese flavor, such flavors as can be selected from, but are not limited to cheddar, parmesan, romano, provolone, swiss, mozzarella, blue and cream cheese, sour cream and yogurt, together with various other dairy/cheese flavors or combinations thereof as would be understood by those skilled in the art made aware of this invention.

As discussed above and illustrated elsewhere herein, such a modified matrix system can be restructured with control of various thermal-related rheological properties corresponding to a protein and/or fat component thereof. Such control can be at least in part defined or monitored by the degree of oiling-off (e.g., ranging from the absence to an excess thereof), such a phenomenon as can be incident to consumer food preparation.

In part, the present invention can also be directed to a method of preparing or using protein structure modification to prepare a restructured cheese. Such a method can comprise providing a proteinaceous natural cheese comprising an initial fat and water content; treating such cheese with an aqueous medium, such a medium comprising a basic species at least partially sufficient to modify and/or impart a liquid consistency to such a natural cheese starting material; and interacting such a modified natural cheese with a flavoring composition of the sort discussed above and illustrated elsewhere herein, such a composition as can be in an amount at least partially sufficient to restore or restructure such a natural cheese. More generally, as discussed above, such a method can comprise providing a proteinaceous natural cheese component; treating such a component with a protein structure modification component comprising a base, such a modification component in an amount and of a pH to modify a protein structure of such a natural cheese component; and interacting or treating such a modified natural cheese component with a flavoring composition comprising an acid and at least one flavor component, such a flavoring composition in an amount and of a pH to restructure such a modified natural cheese component and provide it with a desired flavor characteristic.

Without limitation, a natural cheese starting material can be selected from mozzarella and cheddar type cheeses. Regardless, cheese restructured therefrom can comprise a moisture and/or fat content similar to or different from that of the natural cheese starting material. In certain embodiments, such a flavoring composition can be formulated to provide such a restructured natural cheese a flavor or textural characteristic, or both, distinct from those of the starting material. Accordingly, in certain such embodiments, a restructured natural cheese of this invention can be, for instance, a parmesan or a provolone cheese. Without limitation, such a flavoring composition can be provided as a dry blend, part of an aqueous formulation or a combination thereof, interaction of which with a modified natural cheese matrix can be accomplished simultaneously or step-wise.

Optional additives can be as discussed above or illustrated elsewhere herein, and can be introduced at a time of natural cheese treatment/modification, upon restructure or both. In certain embodiments, one or more dry animal proteins, vegetable proteins or combinations thereof can be introduced to affect moisture content, stability or subsequent physical manipulation and packaging of such a restructured natural cheese. In certain such embodiments, such additives are limited only by salts of a nature or in an amount to at least partially emulsify a protein component of a natural cheese starting material—such salt or amount thereof, the presence of which would otherwise be understood by those skilled in the art as providing a process cheese.

DETAILED DESCRIPTION OF CERTAIN EMBODIMENTS

Figure 1:
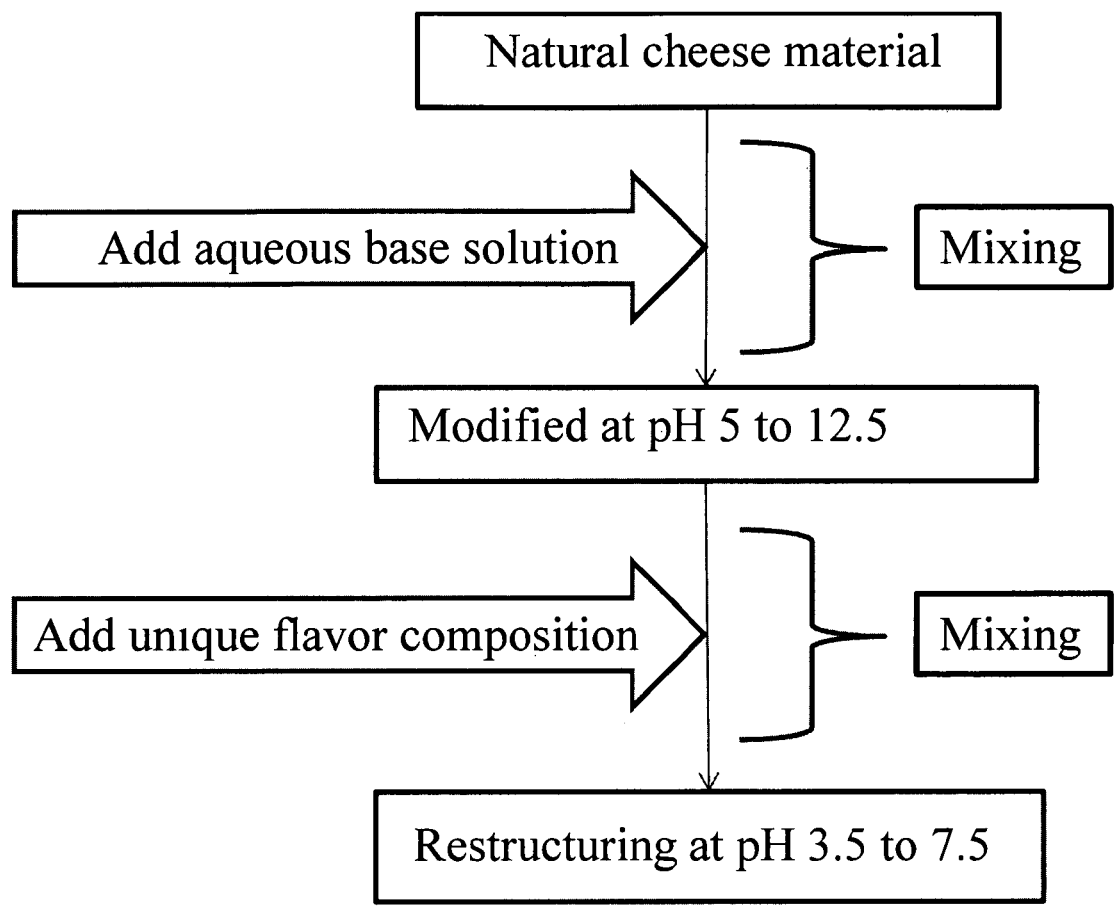
FIG. 1. A schematic flowchart illustrating the restructure of one or more natural cheese materials, in accordance with certain embodiments of this invention.

Various non-limiting embodiments of this invention can be considered with reference to the schematic flowchart of FIG. 1. A starting natural cheese material is treated with food grade aqueous base of sufficient concentration and volume, with mixing, to provide a modified cheese matrix of pH about 5 to about 12.5. In certain embodiments, depending upon starting material and desired restructured cheese product, the matrix is modified and the pH can be about 8 to about 10. Thereafter, with mixing, a unique formulated flavoring composition is introduced to adjust matrix pH, structure and/or functionality depending on desired cheese variety. As discussed above and illustrated below, such a flavoring composition can be formulated to include a food grade proton donor or Lewis acid component. In doing so, the visco-elastic properties of the restructured matrix can be either maintained so as to approximate those of the natural cheese starting material or altered to provide new visco-elastic properties and related textures. Regardless, continued processing of the restructured cheese product can include cutting, slicing, shredding, mixing, grinding, heating and/or dispersing the restructured product, or incorporating into a prepared food product prior to packaging or distribution.

As used herein, the term "visco" pertains to the rheological parameters of materials such that imparted stress energy and the resultant strain energy is dissipated into the material in the form of heat.

Also, as used herein, the term "elastic" pertains to the rheological parameters of materials such that imparted stress energy and the resultant strain energy is stored in the material and can be recovered fully upon removal of the stress.

Also, as used herein, the term "visco-elastic" pertains to rheological parameters of materials such that imparted stress energy and the resultant strain energy has both a partial stored strain that can be recovered upon removal of the stress and a partial strain energy that is dissipated into the material in the form of heat. Various instruments and methods can be used to measure or observe visco-elastic properties, such instruments including, but not limited to, viscometers, penetrometers, shear force cutting machines, flow devices, as well as melting tests or recipes having numeric or judgmental evaluations.

As discussed above, certain embodiments of this invention can be undertaken at ambient temperatures or pressures. Nonetheless, depending upon any particular cheese starting material, reagent, additive or restructured cheese product desired or combinations thereof, any process step, including matrix modification or matrix restructuring, or both, can be conducted at temperatures from about −20° C. to about 140° C. and at pressures from 0 to about 15,000 psi. Any such method step can be performed under pressure or vacuum, optionally with cooling or upon heating or an appropriate time or at a time at least partially sufficient to achieve a desired intermediate, end result or both. For instance, application of suitable pressure, at an appropriate temperature, structure, density or texture, or a combination thereof, can be imparted to obtain a desired restructured cheese product.

FIG. 1 is provided only by way of illustration and is not intended to limit the scope of this invention in any way. A starting cheese material can be selected from various cheddar, monterey jack, swiss and mozzarella-type cheeses and combinations thereof, together with other cheeses of comparable relative value as would be understood by those skilled in the art made aware of this invention. For instance, such a starting material can be any cheese by-product of trims generation from cut-wrap operations, or any cheese material in or out of standard specification accepted in trade for a given cheese variety. Selection can also take into consideration moisture and fat content of any one or more cheese starting materials or restructured cheese products. With regard to the latter, methods of this invention can be specifically designed and tailored to provide, without limitation, particular cheddar, parmesan, romano, provolone, swiss, gouda, camembert, mozzarella or blue-style restructured cheese products. From an economic perspective, such a product can be selected from these and various other cheeses of higher relative value as compared to a starting material from which it was prepared. Such restructured products are limited only by a corresponding flavoring composition and the flavor components thereof.

In addition to the aforementioned cheese flavors, chocolate, tofu, fruit, vegetable, fish, meat, cured meat such as but not limited to bacon, sausage, sourdough, beer, wine, alcoholic spirit, surimi, legume paste flavors and combinations thereof can be introduced. Regardless, a wide range of other additives can be incorporated with such a starting material to affect structure, flavor, preservation, nutrient value, stabilization, color or any combination thereof. Any such additive can be introduced at any process point, but preferably at a point before, during or after matrix modification or, alternatively, at a point before, during or after matrix restructuring. Such additives include but are not limited to flavors, spices, extracts, fruits, meats, enzymes and combinations thereof. Further, various probiotics can also be introduced, alone or in conjunction with other additives, such probiotics including live or deactivated microorganisms, such as eukaryotes, prokaryotes, yeasts, fungi, molds, protozoa and combinations of such live and deactivated microorganisms.

EXAMPLES OF THE INVENTION

The following non-limiting examples and data illustrate various aspect and features relating to the methods and restructured cheese products of the present invention, including the preparation of various value-added, restructured natural cheese products, as are available through the methodologies described herein. In comparison with the prior art, the present methods and restructured products provide results and data which are surprising, unexpected and contrary thereto. While the utility of this invention is illustrated through several starting natural cheese materials, reagents, process parameters and resulting restructured cheese products, it will be understood by those skilled in the art that comparable results are obtainable using various other natural cheese starting materials and process parameters and through corresponding restructured cheese products, as are commensurate with the scope of this invention.

All natural cheese starting materials, including trims, cuts and the like, are available from sources well-known to those skilled in art. Likewise, food grade reagents and additives are also commercially-available. In particular, natural flavoring compositions, such as but not limited to cheddar, provolone and parmesan flavoring compositions, are available from Jeneil Biotech, Inc. of Saukville, Wisconsin.

Example 1

Figure 2:
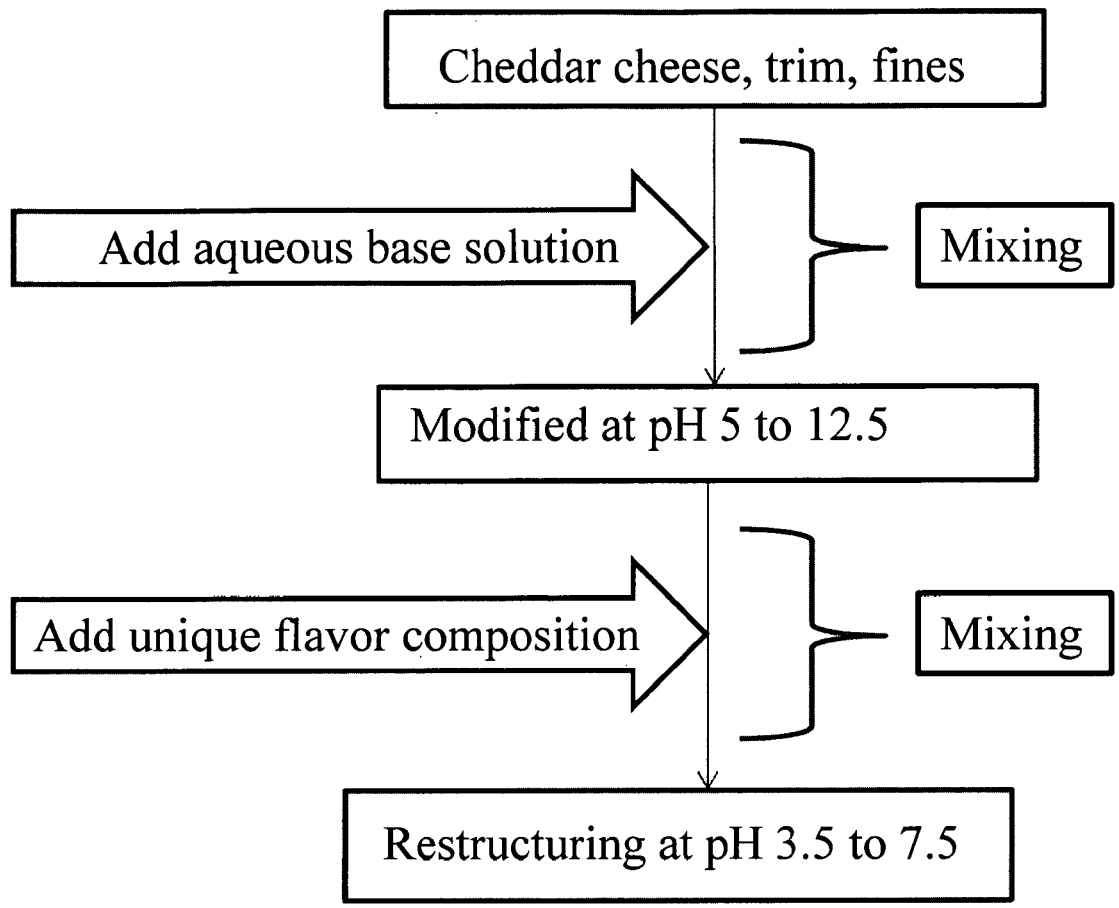
FIG. 2. A schematic flowchart illustrating the restructure of natural cheddar cheese starting materials, in accordance with certain embodiments of this invention.

With reference to FIG. 2, natural cheddar cheese is treated with aqueous base, with mixing, to provide a modified cheese matrix of pH 9.5. With mixing, a selected natural flavoring composition is added for interaction with the modified cheese matrix, bringing the pH to 5.2.

Example 2

A variation of the method of Example 1 is to provide cheddar cheese (79 wt. %), natural cheddar flavoring composition (17.0 wt. %), and aqueous base (4 wt. %). A restructured cheddar-style cheese product is about 40 wt. % moisture, 30 wt. % fat and 3 wt. % salt.

Example 3

With reference to Example 2, bacon flavoring and/or bacon bits are introduced at a point before, during or after matrix restructuring.

Example 4

With reference to Example 2, one or more probiotic cultures, of the sort well-known to those skilled in the art, are introduced. Thereafter, process temperature may be raised from ambient to deactivate at least a portion of one or more such cultures.

Example 5

With reference to Example 2, moisture content of a resulting restructured cheese product is adjusted and/or stabilizers are introduced, according to desired form (e.g., block, slices, spread, etc.)

Example 6

A parmesan-style cheese is prepared with mozzarella cheese (76 wt. %, dried to 27% moisture), natural parmesan flavoring composition (16 wt. %) and aqueous sodium hydroxide (8 wt. %). A restructured parmesan-style cheese product is 35% moisture, 25% fat and 4% salt.

Example 7

With reference to Example 6, dried cheese powder is added to lower moisture content to less than 32%.

Example 8

With reference to Example 6, additional soy and/or dairy protein (e.g., whey protein isolates) are added to lower moisture content, to vary texture and/or to stabilize the cheese product, depending on end-use.

Example 9

Another parmesan-style cheese is prepared with mozzarella cheese (65 wt. %, dried to 20% moisture), swiss cheese (15 wt. %), parmesan cheese (5 wt. %), natural parmesan flavoring composition (8.0 wt. %), aqueous base (6 wt. %), and added salt (1 wt. %). A restructured parmesan-style cheese product is 31% moisture, 26% fat and 4% salt.

Example 10

A provolone-style cheese is prepared with mozzarella cheese (44 wt. %), cheddar cheese (45 wt. %), natural provolone flavoring composition (7.0 wt. %) and aqueous base (4.0 wt. %). A restructured provolone-style cheese product is 45% moisture, 25% fat, and 2% salt.

Referring to Examples 11-21, below, natural cheese products were prepared with the following natural cheese curd components, each of which is commercially available from sources as are well-known to those skilled in the art:

1. Lowfat acid curd: Grade A dry curd cottage cheese (no cream dressing);
2. Cheese curd: Cheddar cheese;
3. Lowfat curd: the moisture is more than maximum moisture content allowed for skim cheese. That same curd could also be partially dried at about 24 to about 30% moisture to meet the definition of skim cheese);
4. Low moisture part skim curd: low moisture part skim mozzarella, but with partial moisture removed as well (moisture ranges: about 18 to about 22% moisture, about 25 to about 29% moisture, and about 44 to about 48% moisture);
5. Eyed cheese curd: Emmenthal, US style Swiss and Baby Swiss, Gouda, Raclette, and Gruyere; and
6. Cheese curd direct acid set: hydrochloric acid added to milk for 6.08 pH, rennet set, cut, cooked to 39.3° C. (102.7 F), and whey-drained curd. Processed over the course of 2 hrs, 40 mins.

Food grade base and acid components are commercially available from sources well known to those skilled in the art. For instance, food grade sodium hydroxide and hydrochloric acid are available from Sigma-Aldrich (St. Louis, MO). Cheese and dairy flavor components are, as described above, available from Jeneil Biotech, Inc. of Saukville, Wisconsin Such flavor components can be blended, dry or in an aqueous medium, with an acid or base to provide, as would be understood by those in the art made aware of this invention, a corresponding modification component or flavoring composition. A modification component and flavoring composition can be, respectively, added with mixing until desired pH and protein structure are obtained. With reference to FIGS. 1 and 2, restructured natural cheese products were prepared as described below.

Example 11

| Lowfat Cheddar Cheese | Ingredient Composition Range (%) | | | |
|---|---|---|---|---|
| Ingredient | Moisture | Fat | Salt | Percent Use |
| Natural Cheese Component(s) | | | | |
| Lowfat acid curd | 76 to 80 | 0.1 to 0.5 | 0.1 to 0.5 | 33.4 |
| Cheese curd | 34 to 39 | 30 to 36 | 1.6 to 2.0 | 10.0 |
| Lowfat curd | 52 to 55 | 2 to 5 | 2 to 4 | 37.0 |
| Additive(s) | | | | |
| Non-fat milk powder | 2 to 4 | 0.1 to 0.5 | trace | 6.0 |
| Modification Component | | | | |
| Base and flavor components | 50 to 80 | trace | trace | 3.0 |
| Flavoring Composition | | | | |
| Acid and flavor components | 40 to 50 | 20 to 30 | 2 to 4 | 10.6 |
| | | | TOTAL | 100.0 |
| Procedure | | | | |

1) Grind lowfat acid curd.
2) Add base and flavor components. Mix.
3) Grind remaining curd and non-fat milk power. Add. Mix.

-continued

4) Add acid and flavor components. Mix.
5) Mix and cook to 75° C.
6) Pack and cool to 4° C.

|  | Moisture | Fat | Salt | pH |
|---|---|---|---|---|
| Lowfat Cheddar Cheese Composition | 60% | 5.6% | 3.3% | 5.2 |

Example 12

| Feta Style Cheese | Ingredient Composition Range (%) | | | Percent |
|---|---|---|---|---|
| Ingredient | Moisture | Fat | Salt | Use |
| Natural Cheese Component(s) | | | | |
| Lowfat acid curd | 76 to 80 | 0.1 to 0.5 | 0.1 to 0.5 | 45.0 |
| Cheese curd | 34 to 39 | 30 to 36 | 1.6 to 2.0 | 34.0 |
| Additive(s) | | | | |
| Concentrated milkfat | 14 to 20 | 80 to 85 | 0 to 1.5 | 10.0 |
| Modification Component | | | | |
| Base and flavor components | 50 to 80 | trace | trace | 1.5 |
| Flavoring Composition | | | | |
| Acid and flavor components | 40 to 50 | 20 to 30 | 2 to 4 | 9.5 |
| | | | TOTAL | 100.0 |

Procedure

1) Grind lowfat curd, cheese curd, and concentrated milkfat.
2) Add base and flavor components. Mix.
3) Add acid and flavor components. Mix.
4) Mix and cook to 75° C.
5) Pack and cool to 4° C.

|  | Moisture | Fat | Salt | pH |
|---|---|---|---|---|
| Feta Style Cheese Composition | 56% | 21% | 2.7% | 4.6 |

Example 13

| Blue Style Cheese | Ingredient Composition Range (%) | | | Percent |
|---|---|---|---|---|
| Ingredient | Moisture | Fat | Salt | Use |
| Natural Cheese Component(s) | | | | |
| Cheese curd | 34 to 39 | 30 to 36 | 1.6 to 2.0 | 76.0 |
| Additive(s) | | | | |
| Steam condensate and water | 100 | 0 | 0 | 11.0 |
| Modification Component | | | | |
| Base and flavor components | 50 to 80 | trace | trace | 1.5 |
| Flavoring Composition | | | | |
| Acid and flavor components | 40 to 50 | 20 to 30 | 2 to 4 | 11.5 |
| | | | TOTAL | 100.0 |

Procedure

1) Grind cheese curd.
2) Mix and cook to 65° C.
3) Add base and flavor components. Mix.
4) Add acid and flavor components. Mix.
5) Pack and cool to 4° C.

|  | Moisture | Fat | Salt | pH |
|---|---|---|---|---|
| Blue Style Cheese Composition | 45% | 28% | 3.5% | 5.6 |

Example 14

| Camembert Cheese Ingredient | Ingredient Composition Range (%) | | | Percent Use |
|---|---|---|---|---|
| | Moisture | Fat | Salt | |
| Natural Cheese Component(s) | | | | |
| Low-moisture part-skim curd | 25 to 29 | 25 to 31 | 2.2 to 2.6 | 20.0 |
| Cheese curd | 34 to 39 | 30 to 36 | 1.6 to 2.0 | 53.7 |
| Additive(s) | | | | |
| Concentrated milkfat | 14 to 20 | 80 to 85 | 0 to 1.5 | 10.0 |
| Modification Component | | | | |
| Base and flavor components | 50 to 80 | trace | trace | 1.5 |
| Flavoring Composition | | | | |
| Acid and flavor components | 40 to 50 | 20 to 30 | 2 to 4 | 7.8 |
| Additive(s) | | | | |
| Steam condensate and water | 100 | 0 | 0 | 7.8 |
| | | | TOTAL | 100.0 |

Procedure

1) Grind LMPS curd, cheese curd, and concentrated milkfat.
2) Add base and flavor components. Mix.
3) Add acid and flavor components. Mix.
4) Mix and cook to 75° C.
5) Pack and cool to 4° C.

| | Moisture | Fat | Salt | pH |
|---|---|---|---|---|
| Camembert Style Cheese Composition | 42.5% | 31.5% | 2.3% | 5.8 |

Example 15

| Provolone Style Cheese Ingredient | Ingredient Composition Range (%) | | | Percent Use |
|---|---|---|---|---|
| | Moisture | Fat | Salt | |
| Natural Cheese Component(s) | | | | |
| Low-moisture part-skim curd | 25 to 29 | 25 to 31 | 2.2 to 2.6 | 15.0 |
| Low-moisture part-skim curd | 44 to 48 | 18 to 24 | 1.5 to 1.9 | 70.0 |
| Additive(s) | | | | |
| Concentrated milkfat | 14 to 20 | 80 to 85 | 0 to 1.5 | 7.5 |
| Modification Component | | | | |
| Base and flavor components | 50 to 80 | trace | trace | 2.0 |
| Flavoring Composition | | | | |
| Acid and flavor components | 40 to 50 | 20 to 30 | 2 to 4 | 5.5 |
| | | | TOTAL | 100.0 |

Procedure

1) Grind low-moisture part-skim curd and concentrated milkfat.
2) Mix and cook to 65° C.
3) Add base and flavor components. Mix.
4) Add acid and flavor components. Mix.
5) Pack and cool to 4° C.

| | Moisture | Fat | Salt | pH |
|---|---|---|---|---|
| Provolone Style Cheese Composition | 44% | 25% | 2.0% | 5.6 |

Example 16

| Reduced Fat Cheddar Cheese Ingredient | Ingredient Composition Range (%) | | | Percent Use |
|---|---|---|---|---|
| | Moisture | Fat | Salt | |
| Natural Cheese Component(s) | | | | |
| Low-moisture part-skim curd | 44 to 48 | 18 to 24 | 1.5 to 1.9 | 40.2 |
| Cheese curd | 34 to 39 | 30 to 36 | 1.6 to 2.0 | 37.0 |
| Additive(s) | | | | |
| Steam condensate and water | 100 | 0 | 0 | 13.5 |
| Modification Component | | | | |
| Base and flavor components | 50 to 80 | trace | trace | 1.3 |
| Flavoring Composition | | | | |
| Acid and flavor components | 40 to 50 | 20 to 30 | 2 to 4 | 8.0 |
| | | | TOTAL | 100.0 |

Procedure

1) Grind low-moisture part-skim curd and cheese curd.
2) Add base and flavor components. Mix.
3) Mix and cook to 65° C.
4) Add acid and flavor components. Mix.
5) Pack and cool to 4° C.

| | Moisture | Fat | Salt | pH |
|---|---|---|---|---|
| Reduced Fat Cheddar Cheese Composition | 51% | 22% | 2.5% | 5.3 |

Example 17

| Reduced Fat Cheddar Cheese Ingredient | Ingredient Composition Range (%) | | | Percent Use |
|---|---|---|---|---|
| | Moisture | Fat | Salt | |
| Natural Cheese Component(s) | | | | |
| Lowfat curd | 52 to 55 | 2 to 5 | 2 to 4 | 36.0 |
| Cheese curd | 34 to 39 | 30 to 36 | 1.6 to 2.0 | 54.0 |
| Modification Component | | | | |
| Base and flavor components | 50 to 80 | trace | trace | 2.2 |
| Flavoring Composition | | | | |
| Acid and flavor components | 40 to 50 | 20 to 30 | 2 to 4 | 7.8 |
| | | | TOTAL | 100.0 |

Procedure

1) Grind lowfat and cheese curd.
2) Add base and flavor components. Mix.
3) Add acid and flavor components. Mix.
4) Mix and cook to 75° C.
5) Pack and cool to 4° C.

| | Moisture | Fat | Salt | pH |
|---|---|---|---|---|
| Reduced Fat Cheddar Cheese Composition | 45% | 20.5% | 3.0% | 5.3 |

Example 18

| Parmesan Style Cheese Ingredient | Ingredient Composition Range (%) | | | Percent Use |
|---|---|---|---|---|
| | Moisture | Fat | Salt | |
| Natural Cheese Component(s) | | | | |
| Low-moisture part-skim curd | 18 to 22 | 27 to 33 | 2.4 to 2.8 | 46.7 |
| Eyed cheese curd | 35 to 39 | 24 to 30 | 0.5 to 1.0 | 20.0 |
| Lowfat curd | 24 to 30 | 2 to 6 | 3.8 to 4.3 | 13.0 |
| Modification Component | | | | |
| Base and flavor components | 50 to 80 | trace | trace | 2.2 |
| Flavoring Composition | | | | |
| Acid and flavor components | 40 to 50 | 20 to 30 | 2 to 4 | 11.1 |

-continued

| Additive(s) | | | | |
|---|---|---|---|---|
| Steam condensate and water | 100 | 0 | 0 | 7.0 |
| | | | TOTAL | 100.0 |

Procedure

1) Grind lowfat curd.
2) Grind eyed and low-moisture part-skim curd. Add.
3) Add base and flavor components. Mix.
4) Add acid and flavor components. Mix.
5) Mix and cook to 75° C.
6) Pack and cool to 4° C.

| | Moisture | Fat | Salt | pH |
|---|---|---|---|---|
| Parmesan Style Cheese Composition | 34% | 22% | 3.2% | 5.2 |

Example 19

| Romano Style Cheese | Ingredient Composition Range (%) | | | Percent |
|---|---|---|---|---|
| Ingredient | Moisture | Fat | Salt | Use |
| Natural Cheese Component(s) | | | | |
| Low-moisture part-skim curd | 25 to 29 | 25 to 31 | 2.2 to 2.6 | 52.3 |
| Eyed cheese curd | 35 to 39 | 24 to 30 | 0.5 to 1.0 | 20.0 |
| Lowfat curd | 24 to 30 | 2 to 6 | 3.8 to 4.3 | 14.0 |
| Modification Component | | | | |
| Base and flavor components | 50 to 80 | trace | trace | 2.2 |
| Flavoring Composition | | | | |
| Acid and flavor components | 40 to 50 | 20 to 30 | 2 to 4 | 8.5 |
| Additive(s) | | | | |
| Water | 100 | 0 | 0 | 3.0 |
| | | | TOTAL | 100.0 |

Procedure

1) Grind lowfat curd.
2) Grind low-moisture part-skim and eyed curd. Add.
3) Add base and flavor components. Mix.
4) Add acid and flavor components. Mix.
5) Mix and cook to 75° C.
6) Pack and cool to 4° C.

| | Moisture | Fat | Salt | pH |
|---|---|---|---|---|
| Romano Style Cheese Composition | 36.5% | 21% | 4.1% | 5.4 |

Example 20

| Cheese Concentrate | Ingredient Composition Range (%) | | | Percent |
|---|---|---|---|---|
| Ingredient | Moisture | Fat | Salt | Use |
| Natural Cheese Component(s) | | | | |
| Cheese curd | 34 to 39 | 30 to 36 | 1.6 to 2.0 | 63.0 |
| Modification Component | | | | |
| Base and flavor components | 50 to 80 | trace | trace | 4.0 |

-continued

| Flavoring Composition | | | | |
|---|---|---|---|---|
| Acid and flavor components | 40 to 50 | 20 to 30 | 2 to 4 | 33.0 |
| | | | TOTAL | 100.0 |

Procedure

1) Grind cheese curd.
2) Add base and flavor components. Mix.
3) Add acid and flavor components. Mix.
4) Pack and cool to 4° C.

-continued

|  | Moisture | Fat | Salt | pH |
|---|---|---|---|---|
| Cheese Concentrate Composition | 41% | 30% | 3.0% | 5.0 |

Example 21

| Cheddar Type Cheese | Ingredient Composition Range (%) | | | Percent |
|---|---|---|---|---|
| Ingredient | Moisture | Fat | Salt | Use |
| Natural Cheese Component(s) | | | | |
| Cheese curd direct acid set | 34 to 39 | 30 to 36 | 0.1 to 0.2 | 94.3 |
| Modification Component | | | | |
| Base and flavor components | 50 to 80 | trace | trace | 3.0 |
| Flavoring Composition | | | | |
| Acid and flavor components | 40 to 50 | 20 to 30 | 2 to 4 | 2.7 |
| | | | TOTAL | 100.0 |

Procedure

1) Grind cheese curd direct acid set.
2) Add base and flavor components. Mix.
3) Add acid and flavor components. Mix.
4) Pack and cool to 4° C.

|  | Moisture | Fat | Salt | pH |
|---|---|---|---|---|
| Cheddar Type Cheese Composition | 39% | 30% | 1.4% | 5.4 |

Example 22

With reference to the methods and procedures of the preceding examples, one or more of the following non-limiting protein sources or components can be used, alone or in conjunction with one or more other proteins or additives of the sort discussed herein, to prepare a range of restructured dairy or dairy analog-based food products:

Milk (at all fat levels);
Fractionated milks: microfiltered, ultrafiltered, nanofiltered, reverse osmosis;
Evaporated milk, condensed milk, concentrated milk, sweetened condensed milk;
Dried milk;
Reconstituted milk (at all fat levels);
Cream, at allowed fat levels, half and half;
Butter, concentrated milkfat;
Dry cream;
Butter milk (not cultured);
Cultured dairy products;
Milk protein concentrate, milk protein isolate, fractionated casein protein, rennet casein, sodium caseinate, potassium caseinate, calcium caseinate, etc.;
Cheese; and
Whey, native whey (not from cheese making but isolated from membranes or other technology), whey protein concentrate, whey protein isolate, protein hydrolyzed whey, fractionated whey protein, deproteinized whey, whey permeate, delactosed whey permeate, demineralized whey, milk mineral.

As is understood in the art, dairy analog proteins are proteins, from either dairy or non-dairy sources, that provide similar nutritive and structural contribution to manufactured diary or dairy emulating products. The preceding proteins of this example can be used, as described herein, alone or in addition to another protein, to prepare various dairy and dairy-analog products, including but not limited to the following:

Creamers (e.g. milk creamer);
Spreads (e.g. process cheese in tubs, butter substitutes);
Sauces (e.g. jar or canned cheese sauce);
Dips (e.g. sour cream based dips);
Fondue (e.g. heated dipping cheese);
Toppings (e.g. whipped cream);
Puddings (e.g. milk pudding, custards);
Fondants (e.g. confection fillings);
Caramels (e.g. confection fillings and coatings);
Whipping agents (e.g. egg white replacer);
Stabilizers (e.g. cream cheese spreads);
Fat mimetic (e.g. reduced fat dairy products);
Yogurts (e.g. acidified sauces);
Frozen Confections (e.g. ice cream); and
Stable fat and water emulsion flavor carrier (e.g. butter and cheese vegetable sauce).

We claim:

1. A method of using protein structure modification to prepare a natural cheese product, said method comprising:
providing 63.0 wt % to 94.3 wt % of one or more proteinaceous natural cheeses produced by enzymatic action, 1.3 wt % to 4.0 wt % of a modification component comprising an aqueous food grade base, and 2.7 wt % to 33 wt % of a flavoring composition comprising an aqueous food grade acid;
treating said one or more proteinaceous natural cheeses with the modification component, said modification component in an amount and of a pH to modify a protein structure of said natural cheese, said modification treatment without cooking during said modification treatment and without cooking before acid treatment; and
treating said modified natural cheese with the flavoring composition, said flavoring composition in an amount and of a pH to restructure the protein of said modified natural cheese and provide a natural cheese product.

2. The method of claim 1 wherein said modified natural cheese has a liquid consistency.

3. The method of claim 2 wherein said restructure restores the protein structure of said natural cheese.

4. The method of claim 2 wherein said restructure provides a said natural cheese product distinct from said natural cheese.

5. The method of claim 4 wherein said natural cheese is selected from mozzarella and cheddar cheeses; and said natural cheese product is selected from parmesan, feta, gouda, camembert and blue cheeses.

6. The method of claim 1, wherein providing further comprises providing an additive in an amount of up to 11.0 wt %, wherein the additive is selected from the group consisting of proteins, fats, oils, carbohydrates, preservatives, minerals, nutrients and combinations thereof.

7. The method of claim 6, wherein providing further comprises providing steam condensate or water in an amount of up to 13.5 wt %.

8. A method of preparing a restructured natural cheese, said method comprising:
providing a proteinaceous natural cheese produced by enzymatic action, said natural cheese comprising an initial moisture content;
treating said natural cheese with a protein structure modification component comprising a base, said modification component in an amount and of a pH to modify the protein structure of said natural cheese, said modification treatment without cooking during said modification treatment and without cooking before acid treatment;

treating said modified natural cheese with a flavoring composition comprising an acid, said flavoring composition in an amount and of a pH to restructure said modified natural cheese; and cooking said restructured natural cheese to provide a natural cheese product, said method absent use of an emulsifying salt providing a process cheese.

9. The method of claim 8 wherein said natural cheese product has a moisture content of about 30 wt. % to about 60 wt. %.

10. The method of claim 8 wherein said flavoring composition comprises a flavor component selected from parmesan, feta, gouda, camembert and blue cheese flavorings.

11. A method of preparing a restructured natural cheese, said method comprising:

providing a proteinaceous natural cheese produced by enzymatic action, said natural cheese comprising an initial moisture content;

treating said natural cheese with a protein structure modification component comprising a base, said modification component in an amount and of a pH to modify the protein structure of said natural cheese, said modification treatment without cooking during said modification treatment and without cooking before acid treatment;

treating said modified natural cheese with a flavoring composition comprising an acid, said flavoring composition in an amount and of a pH to restructure said modified natural cheese; and cooking said restructured natural cheese, said method absent use of an emulsifying salt providing a process cheese, said method providing a natural cheese product comprising a pH of about 4.5 to about 6.0 and a moisture content of about 30 wt. % to about 60 wt. %.

12. The method of claim 11 wherein said flavoring composition comprises a flavor component selected from parmesan, feta, gouda, camembert and blue cheese flavorings.

* * * * *